(12) United States Patent
Onishi

(10) Patent No.: US 7,231,647 B2
(45) Date of Patent: Jun. 12, 2007

(54) DISK APPARATUS

(75) Inventor: Katsunori Onishi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 490 days.

(21) Appl. No.: 10/806,475

(22) Filed: Mar. 23, 2004

(65) Prior Publication Data

US 2004/0255312 A1    Dec. 16, 2004

(30) Foreign Application Priority Data

Mar. 24, 2003    (JP)    ............................. 2003-001518

(51) Int. Cl.
G11B 7/085    (2006.01)
(52) U.S. Cl. ...................................... 720/675
(58) Field of Classification Search ................. 720/612, 720/689, 674, 675, 691
See application file for complete search history.

(56) References Cited

U.S. PATENT DOCUMENTS

| 5,063,548 | A | | 11/1991 | Yamashita et al. | |
| 2004/0213110 | A1 | * | 10/2004 | Kamoto et al. | ........... 369/53.19 |
| 2005/0034141 | A1 | * | 2/2005 | Bae et al. | ................... 720/675 |

FOREIGN PATENT DOCUMENTS

| JP | 1-287875 | 11/1989 |
| JP | 2001-101673 | 4/2001 |
| JP | 3082214 U | 9/2001 |
| JP | 2002-288948 | 10/2001 |
| JP | 2001-307438 | 11/2001 |
| JP | 2001-344789 | 12/2001 |

\* cited by examiner

*Primary Examiner*—Angel Castro
(74) *Attorney, Agent, or Firm*—Morgan, Lewis & Bockius LLP

(57) ABSTRACT

A disk apparatus has a tilting mechanism including an insulating resin cap that is attached in such a way as to cover an end portion of a metallic shaft and that has insulation performance, a metallic adjusting screw attached to a chassis in such a way as to abut against a bottom surface of the insulating cap attached to the shaft for moving the end portion of the shaft in an upward/downward direction, a resin shaft receiving pedestal that is attached to the chassis and that supports the end portion of the shaft movably in an upward/downward direction, and a metallic leaf spring that is attached to the shaft receiving pedestal, that abuts against an upper surface of the insulating cap attached to the shaft and that pushes the insulating cap in such a way as to press the insulating cap attached to the shaft against the adjusting screw.

6 Claims, 4 Drawing Sheets

DISK APPARATUS

BACKGROUND OF THE INVENTION

1. Field of the Invention

The present invention relates to a disk apparatus, and more particularly to a disk apparatus having an optical pickup enabled to move in a radial direction of a disk.

2. Description of the Related Art

Hitherto, various disk apparatuses each having an optical pickup enabled to move in a radial direction of a disk have been known (see, for example, JP-A-2001-101673, JP-A-2001-344789, and JP-A-1-287875).

JP-A-2001-101673 discloses a disk apparatus adapted so that a tilt-angle of an optical pickup around one of guide rails, to which the optical pickup is attached, with respect to a disk is adjusted by upwardly and downwardly moving the optical pickup along the other guide rail through the use of an adjusting screw, and that the optical pickup is moved along the two guide rails in a radial direction of the disk.

JP-A-2001-344789 discloses a disk apparatus adapted so that a tilt-angle of an optical pickup with respect to a disk is adjusted by tilting a movable chassis, to which a guide shaft for supporting the optical pickup is attached, around a predetermined axis through the use of plural gears, and that the optical pickup is moved along the guide shaft in a radial direction of the disk.

JP-A-1-287875 discloses a disk apparatus adapted so that insulating tape is wound around each of attachment parts of a shaft for supporting an optical pickup, which are attached to a frame, to there by prevent electrical noises being transmitted from the frame to the optical pickup through the shaft, and that the optical pickup is moved along the shaft in a radial direction of the disk.

FIG. 5 is a top view illustrating a disk drive portion of a related disk apparatus having an optical pickup enabled to move in a radial direction of a disk. FIG. 6 is a side view, taken from a direction of an arrow 150 shown in FIG. 5, which illustrates the disk drive portion of the related disk apparatus shown in FIG. 5. FIG. 7 is a bottom view illustrating a movable chassis of the related disk drive portion shown in FIG. 5. FIG. 8 is a sectional view illustrating the movable chassis shown in FIG. 7 taken along line 170—170 shown in FIG. 7. FIG. 9 is a sectional view illustrating the movable chassis shown in FIG. 7 taken along line 180—180 shown in FIG. 7.

Referring to FIGS. 5 and 6, in a disk drive portion of a related disk apparatus, a chassis 101 formed of a metallic plate material is provided at the bottom thereof. A disk motor 102, on which a disk is placed, for rotating the disk is fixedly mounted on this chassis 101. A movable chassis 101a formed of a metallic plate material is provided above the chassis 101 in such a way as to be spaced by a predetermined distance from the chassis 101. As shown in FIGS. 5 and 7, a first metallic shaft 103a and a second metallic shaft 103b are attached to this movable chassis 101a in such a manner as to be parallel with each other.

An optical pickup 103 is supported by the first shaft 103a and the second shaft 103b in such a way as to move in a direction of an arrow A shown in FIG. 5 (that is, in a radial direction of a disk). As shown in FIGS. 5 and 7, a displacement motor 105 for displacing the optical pickup 104 is attached to the bottom surface of the movable chassis 101a. This displacement motor 105 has a drive shaft 105a on which a gear is formed. The optical pickup 104 is engaged with the drive shaft 105a of this displacement motor 105.

One of end portions of the first shaft 103a is attached to a resin shaft support member 106 provided on the bottom surface of the movable chassis 101a, as shown in FIG. 7. The other end portion of the first shaft 103a is fixedly attached to a first shaft fixing resin member 106, which is provided on the bottom surface of the movable chassis 101a, by a metallic fixing member 113, as shown in FIGS. 7 and 8. The metallic fixing member 113 is screwed to the metallic chassis 101a by the metallic screw 114.

Both end portions of the second shaft 103b are fixedly attached to a second shaft fixing resin member 106b provided on the bottom surface of the movable chassis 101a by a metallic washer 115, as shown in FIGS. 7 and 9. The metallic washer 115 is screwed to the metallic movable chassis 101a together with the second shaft fixing member 106b by a metallic screw 116.

A support projection member 117 having a semispherical end portion is attached to the bottom surface of an end portion that the movable chassis 101a has at a side, at which the first shaft 103a is installed, as illustrated in FIGS. 5 to 7. A support receiving member 118 having a conical (or spherical) support surface is provided at a place, which corresponds to the support projection member 117, in the chassis 101, as shown in FIG. 6. The semispherical end portion of the support projection member 117 is supported by the support receiving member 118 in such a way as to move by simultaneously contacting the spherical support surface of the support receiving member 118. A pressing member 119 constituted by a leaf spring is attached to the chassis 101 in such a manner as to downwardly pressing the support projection member 117 attached to the movable chassis 101a. This pressing member 119 is provided so as to prevent the support projection member 117 from the support receiving member 118.

A first tilting mechanism 107a is provided at an end portion that the movable chassis 101 has at a side at which the second shaft 103b is installed, as shown in FIG. 5. This first tilting mechanism 107 is provided so as to tilt the movable chassis 101a so that the end portion of the movable chassis 101a upwardly and downwardly moves around the support projection member 117. The first tilting mechanism 107a has a projection member 120a, a projection receiving member 120b, a holder 120c, and an adjusting screw (not shown).

An end portion of the projection member 120a is hemispherically formed and attached to the bottom surface of the movable chassis 101a in such a way as to downwardly protrude therefrom. The projection receiving member 120b is provided in such a way as to support the projection member 120a from below so that the projection member 120a is movable. The holder 120c is attached to the chassis 101 and provided in such a way as to support the projection receiving member 120b so that the projection receiving member 120b can upwardly and downwardly move. The adjusting screw (not shown) is engaged with the chassis 101 and provided in such a way as to abut against the bottom surface of the projection receiving member 120b. Also, the adjusting screw (not shown) is provided in such a way as to be able to upwardly and downwardly move by being turned.

As shown in FIG. 5, a hook member 121 is provided in the vicinity of each of the first tilting mechanism 107a of the movable chassis 101a and the support projection member 117. Hook receiving members 122, with which the hook members 121 engage, are provided at places corresponding to the hook members 121 of the chassis 101, respectively. Each of these hook receiving members 122 is shaped so that the hook member 121 can engage therewith in such a way as to have a predetermined play therefrom. The hook member 121 and the hook receiving member 122 prevent the distance between the movable chassis 101a and the chassis 101 from becoming equal to or more than a predetermined distance.

As shown in FIGS. 5 and 6, a second tilting mechanism 107b is provided in the disk drive portion. This second tilting mechanism 107b has a tilt motor 123a, a drive transmission gear 123b, an intermediate gear 123c, a cam gear 123d, a cam-gear projection member 123e, and a spring member 123f. The tilt motor 123a is fixedly attached to the chassis 101. The drive transmission gear 123b is attached to a drive shaft of the tilt motor 123a. The intermediate gear 123c meshes, with the drive transmission gear 123b and the cam gear 123d. A cam portion 123g having a predetermined slope shape is formed on the top surface of the cam gear 123d, as shown in FIG. 6. The cam gear projection member 123e is attached to the movable chassis 101g and provided in such a way as to abut against the cam portion 123g. The spring member 123f is attached to the chassis 101 and pushes the cam gear projection member 123e against the cam portion 123g of the cam gear 123d.

Next, an operation of the first tilting mechanism 107a of the disk drive portion of the related disk apparatus is described hereinbelow by referring to FIG. 5. First, the adjusting screw (not shown) abutting against the bottom surface of the projection member 120a is turned. Thus, the adjusting screw (not shown) is moved upwardly or downwardly. This is accompanied by an upward or downward movement of the projection receiving member 120b. Thus, an end portion of the movable chassis 101a, at which the projection member 120a is provided, is moved upwardly or downwardly. Consequently, the movable chassis 101a is upwardly or downwardly tilted around the support projection member 117.

An operation of the second tilting mechanism 107b of the disk drive portion is described hereinbelow by referring to FIGS. 5 and 6. The cam gear 123d is turned by transmitting drive from the tilt motor 123a thereto through the drive transmission gear 123b and the intermediate gear 123c. When the cam gear 123d is turned, the cam gear projection member 123e is upwardly and downwardly moved along the slope shape of the cam portion 123g. Consequently, the movable chassis 101a, on which the cam gear projection member 123e is provided, is upwardly or downwardly tilted around the support projection member 117 and the projection member 120a.

SUMMARY OF THE INVENTION

However, the disk drive portion of the related disk apparatus shown in FIG. 5 has a drawback that the first tilting mechanism 107a and the second tilting mechanism 107b, which are provided for adjusting the tilt-angle of the optical pickup 104, are constituted by many components. Thus, the related disk apparatus has a problem in that the tilting mechanisms are complex. Meanwhile, as described above, in the disk drive portion of the related disk apparatus shown in FIG. 5, the metallic first shaft 103a is attached to the metallic movable chassis 101a by the metallic fixing member 113 and the metallic screw 114. Moreover, the metallic second shaft 103b is attached to the metallic movable chassis 101a by the metallic washer 115 and the metallic screw 116. Thus, the related disk apparatus has a drawback that electrical noises generated from the displacement motor 105 attached to the movable chassis 101a are transmitted through the metallic movable chassis 101a, the metallic screws 114, 116, the metallic fixing means 113 and the metallic washer 15 to the metallic first shaft 103a and the metallic second shaft 103b. Consequently, the related disk apparatus has a problem in that electrical noises are transmitted to the optical pickup 104 supported by the first shaft 103a and the second shaft 103b.

Even the disk apparatuses disclosed in the JP-A-2001-101673 and the JP-A-2001-344789 do not have structures for restraining electrical noises from being transmitted to optical pickups. Therefore, these disk apparatuses have the problem in that electrical noises are transmitted to an optical pickup, similarly to the related disk apparatus shown in FIG. 5.

Although the disk apparatus disclosed in the JP-A-1-287875 can restrain electrical noises from being transmitted to an optical pickup, this disk apparatus does not have a tilting mechanism. Thus, this disk apparatus has a problem in that a tilt-angle of the optical pickup with respect to a disk cannot be adjusted.

This invention is accomplished to solve the aforementioned problems. Accordingly, an object of the invention is to provide a disk apparatus having a simple tilting mechanism and which enables to restrain electrical noises from being transmitted to an optical pickup.

To achieve the foregoing object, according to an aspect of the invention, there is provided a disk apparatus including: a metallic chassis; a disk motor mounted on the chassis for rotating a disk; an optical pickup disposed at a predetermined distance from the disk and being movable in a radial direction of the disk; a metallic shaft for movably supporting the optical pickup; a displacement motor attached to the chassis for displacing the optical pickup; and a tilting mechanism for adjusting a tilt-angle of the optical pickup with respect to the disk, the tilting mechanism including: an insulating cap attached to and covering an end portion of the metallic shaft, the insulating cap made of a resin and having insulation performance; a metallic adjusting screw attached to the chassis in such a way as to abut against a bottom surface of the insulating cap attached to the end portion of the shaft for upwardly and downwardly moving the end portion of the shaft; a shaft receiving pedestal made of a resin and attached to the chassis, the shaft receiving pedestal adapted to support the end portion of the shaft upwardly and downwardly movably, the shaft receiving pedestal having a slip-off preventing wall adapted to abut against an upper surface of the insulating cap for preventing the end portion of the shaft from slipping off and a support portion adapted to abut against a bottom surface of the end portion of the shaft for preventing the end portion of the shaft from downwardly moving rather than a predetermined position; and a metallic leaf spring attached to the chassis via the shaft receiving pedestal and adapted to abut against the upper surface of the insulating cap attached to the end portion of the shaft, and also adapted to push the insulating cap attached to the end portion of the shaft against the adjusting screw, and substantially U-shaped in top view.

According to the disk apparatus, as described above, the insulating cap having insulation performance is attached to the end portion of the metallic shaft. Thus, electrical noises generated from the displacement motor for displacing the optical pickup, and so on can be restrained from being transmitted to the metallic shaft through the metallic chassis and the metallic leaf springs. Also, electrical noises can be prevented from being transmitted to the metallic shaft through the metallic chassis and the metallic adjusting screw. Consequently, electrical noises can be restrained from being transmitted to the optical pickup supported by the metallic shaft. Further, the tilting mechanism is constituted by four components, that is, the insulating cap, the adjusting screw, the shaft receiving pedestal, and the leaf spring. Consequently, the disk apparatus can obtain a simple tilting mechanism, as compared with the related tilting mechanism including many components. Furthermore, the slip-off preventing wall, which abuts against the top surface of the insulating cap of the shaft, for preventing the end portion of the shaft from slipping off the shaft receiving pedestal is provided in the shaft receiving pedestal. Thus the disk apparatus can easily prevent the end portion of the shaft from slipping off the shaft receiving pedestal. Consequently, the disk apparatus can easily prevent the end portion of the shaft from dropping off the shaft receiving pedestal. Further, the support portion, which abuts against the bottom surface of the end portion of the shaft, for preventing the end portion of the shaft from moving downwardly rather than the predetermined position is provided in the shaft receiving pedestal. Thus, the disk apparatus can easily prevent the end portion of the shaft from excessively downwardly moving. Consequently, the disk apparatus can easily prevent the optical pickup, which is supported by the shaft, from excessively downwardly moving. Accordingly, the disk apparatus can easily prevent the optical pickup from colliding with other components and the like installed thereunder. Furthermore, in the disk apparatus, the leaf spring is substantially U-shaped in top view. Thus, the elastic portion of the leaf spring can be lengthened. Consequently, an elastic force of the leaf spring can be increased. Thus, the end portion of the shaft can be more surely pressed against the adjusting screw 9.

According to a second aspect of the invention, there is provided a disk apparatus including: a chassis to which a displacement motor for displacing an optical pickup is attached; a metallic shaft for movably supporting the optical pickup; and a tilting mechanism for adjusting a tilt-angle of the pickup with respect to the disk, the tilting mechanism including: an insulating member having insulation performance, which is attached to and covers an end portion of the shaft; a metallic adjusting screw provided in such a way as to abut against the insulating member attached to the shaft; a shaft receiving pedestal for supporting the end portion of the shaft upwardly and downwardly movably; and a metallic pressing member for pressing the insulating member attached to the shaft against the adjusting screw.

According to the disk apparatus, as described above, the insulating cap having insulating performance is attached to the end portion of the metallic shaft. Thus, electrical noises generated from the displacement motor for displacing the optical pickup, and so on can be restrained from being transmitted to the metallic shaft through the metallic chassis and the metallic pressing member. Also, electrical noises can be prevented from being transmitted to the metallic shaft through the metallic chassis and the metallic adjusting screw. Consequently, electrical noises can be restrained from being transmitted to the optical pickup supported by the metallic shaft. Moreover, the tilting mechanism is constituted by four components, that is, the insulating cap, the adjusting screw, the shaft receiving pedestal, and the pressing member. Consequently, the disk apparatus can obtain a simple tilting mechanism, as compared with the related tilting mechanism including many components.

In the disk apparatus, preferably, the shaft receiving pedestal includes a slip-off preventing wall for preventing the end portion of the shaft from slipping off. With such a configuration, the end portion of the shaft can easily be prevented from slipping off the shaft receiving pedestal. Consequently, the end portion of the shaft can easily be prevented from dropping off the shaft receiving pedestal.

In the disk apparatus, preferably, the shaft receiving pedestal includes a support portion for preventing the end portion of the shaft from downwardly moving rather than a predetermined position. With such a configuration, the optical pickup supported by the shaft can easily be prevented from excessively downwardly moving. Consequently, the optical pickup can be prevented from colliding with other components and the like installed thereunder.

In the disk apparatus, preferably, the pressing member includes a metallic spring member. With such a configuration, the end portion of the shaft, to which the insulating member is attached, can be upwardly and downwardly moved by simultaneously pressing the insulating member against the adjusting screw.

In this case, preferably, the spring member includes a metallic leaf spring substantially U-shaped in top view. With such a configuration, an elastic portion of the leaf spring can be lengthened. Consequently, an elastic force of the leaf spring can be increased. Thus, the end portion of the shaft can be more surely pressed by the elastic force of the leaf spring against the adjusting screw.

Figure 5:
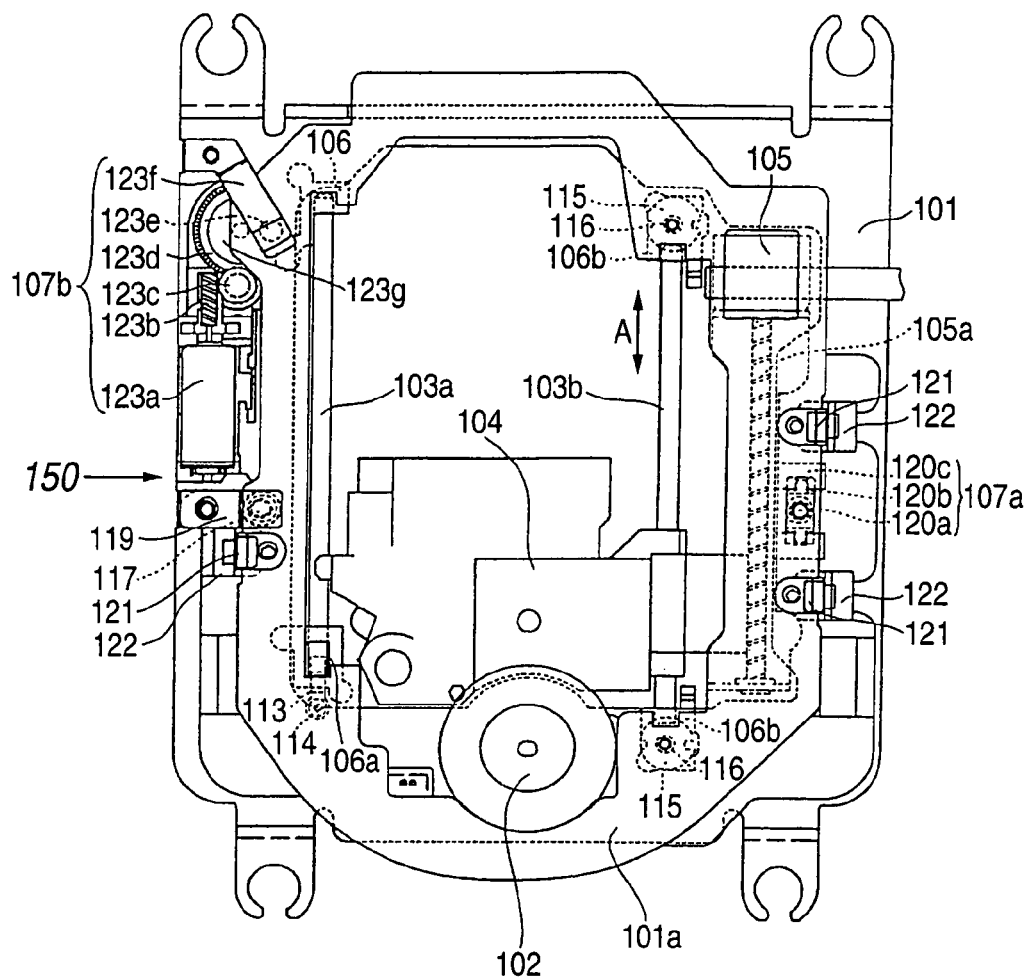
FIG. 5 is a top view illustrating a disk drive portion of a related disk apparatus having an optical pickup enabled to move in a radial direction of a disk.
Figure 6:
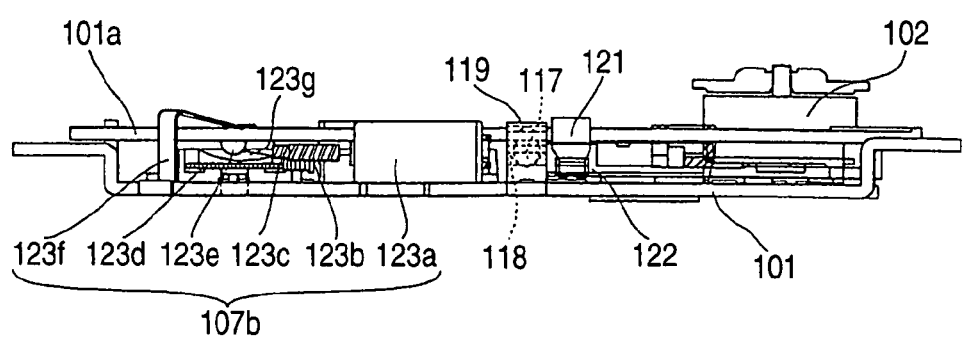
FIG. 6 is a side view, taken from a direction of an arrow 150 shown in FIG. 5, which illustrates the disk drive portion of the related disk apparatus shown in FIG. 5.
Figure 7:
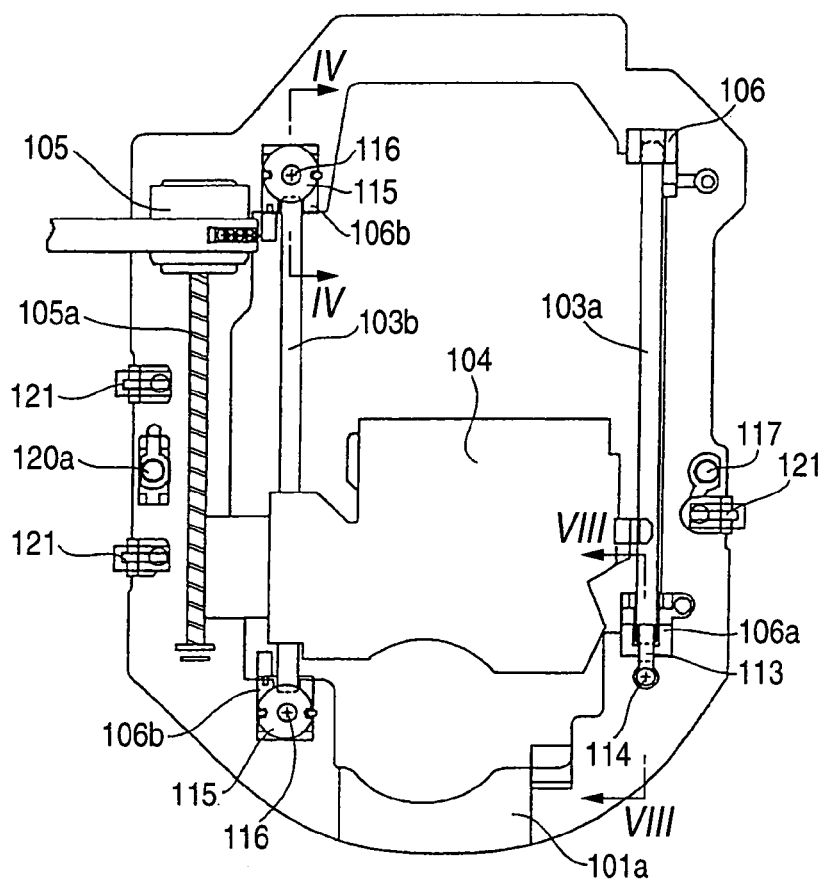
Figure 8:
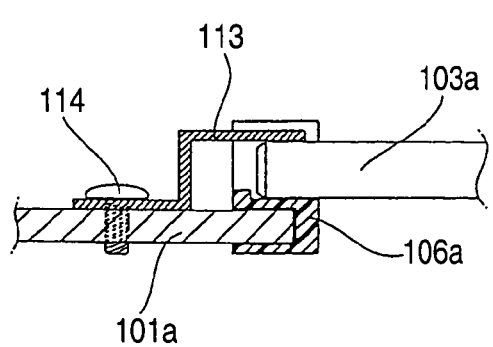
Figure 9:
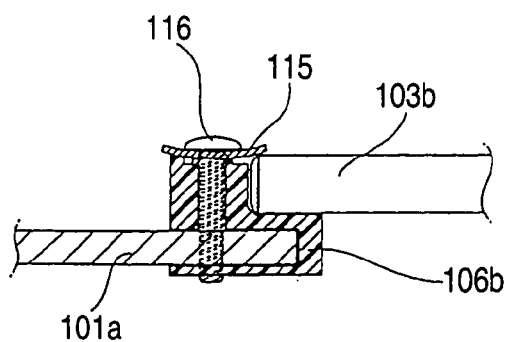

FIG; 7 is a bottom view illustrating a movable chassis of the related disk drive portion shown in FIG. 5;

FIG. 8 is a sectional view illustrating the movable chassis shown in FIG. 7, which is taken along line 180—180 shown in FIG. 7; and FIG. 9 is a sectional view illustrating the movable chassis shown in FIG. 7, which is taken along line 180—180 shown in FIG. 7.

DETAILED DESCRIPTION OF THE PREFERRED EMBODIMENTS

Hereinafter, an embodiment of the invention is described with reference to the accompanying drawings.

Figure 1:
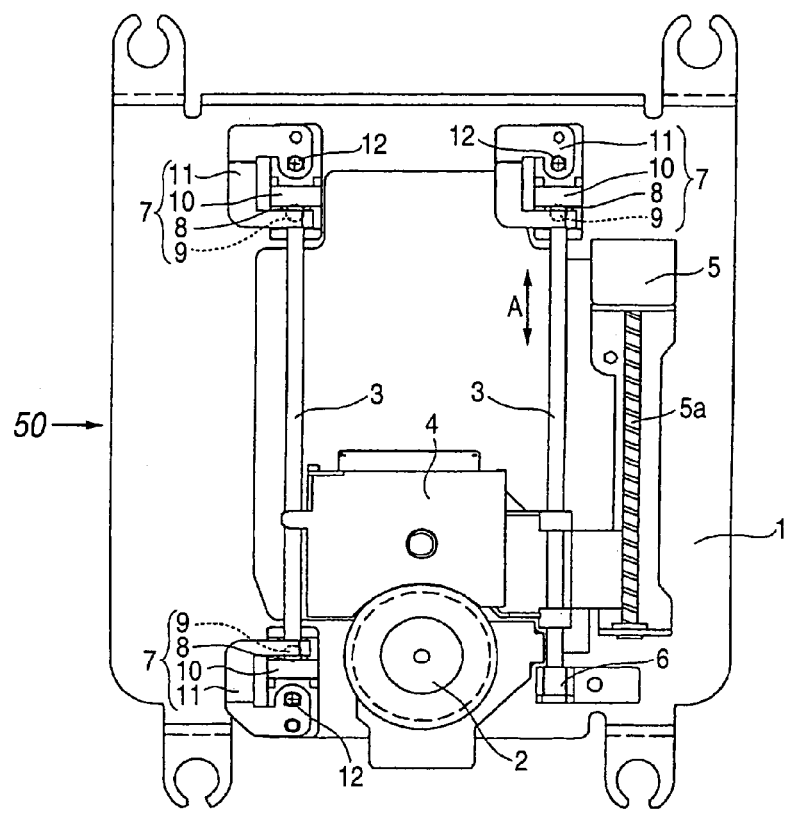
FIG. 1 is a top view illustrating a disk drive portion of a disk apparatus, which is an embodiment of the invention.
Figure 2:
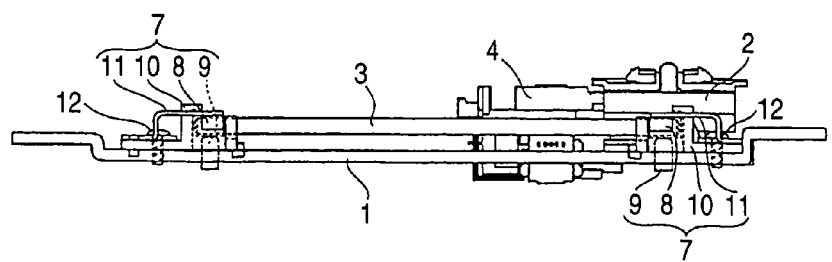
FIG. 2 is a side view, taken from a direction of an arrow 50 shown in FIG. 1, which illustrates the disk drive portion of the disk apparatus that is the embodiment of the invention shown in FIG. 1.
Figure 3:
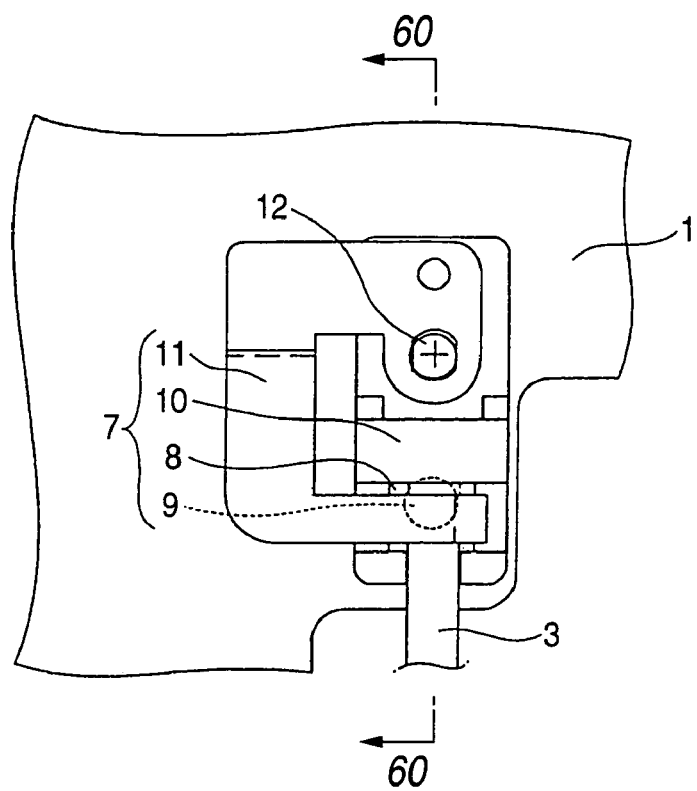
FIG. 3 is an enlarged top view illustrating a tilting mechanism part of the disk drive portion of the disk apparatus that is the embodiment of the invention shown in FIG. 1.
Figure 4:
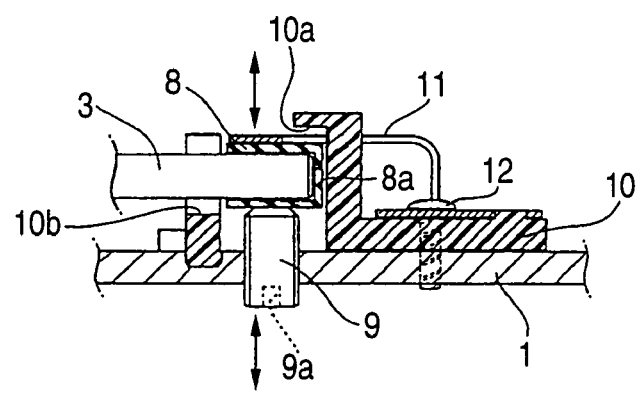
FIG. 4 is a sectional view illustrating the tilting mechanism part shown in FIG. 3, which is taken along line 60—60 shown in FIG. 3.

FIG. 1 is a top view illustrating a disk drive portion of a disk apparatus, which is an embodiment of the invention. FIG. 2 is a side view, taken from a direction of an arrow 50 shown in FIG. 1, which illustrates the disk drive portion of the disk apparatus that is the embodiment of the invention shown in FIG. 1. FIG. 3 is an enlarged top view illustrating a tilting mechanism part of the disk drive portion of the disk apparatus that is the embodiment of the invention shown in FIG. 1. FIG. 4 is a sectional view illustrating the tilting mechanism part shown in FIG. 3, which is taken along line 60—60 shown in FIG. 3. The structure of the disk drive portion of the disk apparatus according to this embodiment is described hereinbelow by referring to FIGS. 1 to 4.

As shown in FIGS. 1 and 2, the disk drive portion of the disk apparatus according to this embodiment is provided with a chassis 1 formed of a metallic plate material. A disk motor 2, onto which a disk is placed, for rotating the disk is fixedly mounted on this chassis 1. Two metallic shafts 3 are attached to the chassis 1 in such a way as to be parallel to each other. An optical pickup 4 is supported by these two shafts 3 in such a manner as to be able to move in the direction of an arrow A (that is, in a radial direction of a disk) shown in FIG. 1. A displacement motor 5 for displacing the optical pickup 4 is attached to the chassis 1. This displacement motor 5 has a drive shaft 5a on which a gear is formed. The optical pickup 4 is engaged with this drive shaft 5a of the displacement motor 5.

An end portion of one of the two shafts 3, which is provided at the side of the displacement motor 5, is attached to a resin shaft support member 6 provided on the chassis 1. As shown in FIG. 1, three tilting mechanisms 7 are provided at places respectively corresponding to the remaining three end portions of the two shafts 3.

In this embodiment, each of the tilting mechanisms 7 includes an insulating cap 8, an adjusting screw 9, a shaft receiving pedestal 10, and a leaf spring 11, as shown in FIGS. 1 to 3. Incidentally, the insulating cap 8 is an example of an "insulating member" according to the invention. The leaf spring 11 is an example of each of a "pressing member" and the "spring member" according to the invention.

In this embodiment, the insulating cap 8 is attached to and covers an end portion of the shaft 3, as shown in FIG. 4. This insulating cap 8 is formed by using an insulating resin in such a way as to have a thickness of about 0.5 mm. As shown in FIG. 4, a hole portion 8a for air vent is provided in a top surface (a surface facing to an end surface of the shaft 3) of the insulating cap 8 so as to facilitate the insertion of the shaft 3 thereinto.

The metallic adjusting screw 9 is upwardly and downwardly movably attached to the metallic chassis 1 in such a way as to abut against a bottom surface of the insulating cap 8. A hex wrench hole portion 9a, into which a hex wrench is inserted, for turning the adjusting screw 9 is formed in the bottom surface of this adjusting screw 9. As shown in FIGS. 1 to 4, the resin shaft receiving pedestals 10 are provided at places on the chassis 1, which respectively correspond to the positions of the end portions of the shafts 3, to each of which the insulating cap 8 is attached. These shaft receiving pedestals 10 are provided so as to support the end portion of the shafts 3 in such a way as to be able to upwardly and downwardly move these end portions.

In this embodiment, a slip-off preventing wall 10a, which abuts against an upper surface of the insulating cap 8 attached to the end portion of each of the shafts 3 thereby to prevent this end portion from slipping off the associated shaft receiving pedestal 10, is integrally provided with the associated shaft receiving pedestal 10, as shown in FIG. 4. A space of about 1 mm is provided between this slip-off preventing wall 10a and the insulating cap 8 attached to the end portion of the associated shaft 3.

Also, in this embodiment, a support portion 10b, which abuts against the bottom surface of the end portion of the shaft 3 thereby to prevent this end portion from downwardly moving from a predetermined position, is integrally provided with each of the resin shaft receiving pedestals 10. A space of about 1 mm is provided between this support portion 10b and the bottom surface of the end portion of each of the shafts 3.

Each of the leaf springs 11 is attached to the chassis 1 by a metallic screw 12 via the associated shaft receiving pedestal 10. Each of the leaf springs 11 is formed of a stainless steel plate having a thickness of about 0.5 mm. Each of the leaf springs 11 abuts against the upper surface of the insulating cap 8 attached to the end portion of the associated shaft 3, and pushes the associated insulating cap 8 against the associated adjusting screw 9.

In this embodiment, as shown in FIG. 3, each of the leaf springs 11 is substantially U-shaped in top view. Thus, each of the leaf springs 11 is formed in such a way as to lengthen an elastic part thereof.

Next, an operation of each of the tilting mechanisms of the disk drive portion of the disk apparatus according to this embodiment is described hereinbelow by referring to FIG. 4.

As illustrated in FIG. 4, first, the adjusting screw 9 is turned in such a manner as to upwardly or downwardly move. In the case of turning the adjusting screw 9 in such a way as to upwardly move, the adjusting screw 9 pushes up the bottom surface of the insulating cap 8 attached to the end portion of the shaft 3. Thus, the end portion of the shaft 3 upwardly moves. Then, when the end portion of the shaft 3 upwardly moves by a predetermined distance, the top surface of the insulating cap 8 attached to the end portion of the shaft 3 is made to abut against the slip-off preventing wall 10a of the shaft receiving pedestal 10. Consequently, the end portion of the shaft 3 is prevented from moving further upwardly.

Conversely, in the case of turning the adjusting screw 9 in such a manner as to downwardly move, as the adjusting screw 9 downwardly moves, the end portion of the shaft 3 is downwardly moved, because the end portion of the shaft 3 is pushed against the adjusting screw 9 by the leaf spring 11. Then, when the end portion of the shaft 3 is downwardly moved by a predetermined distance, the bottom surface of the end portion of the shaft 3 is made to abut against the support portion 10b of the shaft receiving pedestal 10. Consequently, the end portion of the shaft 3 is prevented from moving further downwardly. The upward or downward position of the end portion of the shaft 3 is adjusted by operating the three tilting mechanisms, which are provided on the disk drive portion, in the aforementioned manner.

As described above, in this embodiment, each of the insulating caps 8 having nonconductivity is attached to the end portion of the associated metallic shafts 3. Thus, electrical noises generated from the displacement motor 5 for displacing the optical pickup 4 and so on can be restrained from being transmitted to the metallic shaft 3 through the metallic chassis 1, the metallic screws 12 and the metallic leaf springs 11. Also, electrical noises can be prevented from being transmitted to each of the metallic shafts 3 through the metallic chassis 1 and the associated metallic adjusting screw 9. Consequently, electrical noises can be restrained from being transmitted to the optical pickup 4 supported by the metallic shafts 3.

In this embodiment, each of the tilting mechanisms 7 is constituted by four components, that is, the insulating cap 8, the adjusting screw 9, the shaft receiving pedestal 10, and the leaf spring 11. Consequently, this embodiment can obtain simple tilting mechanisms, as compared with the related tilting mechanism including many components.

In this embodiment, the slip-off preventing wall 10a, adapted to abut against the top surface of the insulating cap 8 of each of the shafts 3, for preventing the end portion of the associated shaft 3 from slipping off the associated shaft receiving pedestal 10 is provided in the associated shaft receiving pedestal 10. Thus, this embodiment can easily prevent the end portion of each of the shafts 3 from dropping off the shaft receiving pedestal 10.

In this embodiment, the support portion 10b, adapted to abut against the bottom surface of the end portion of each of the shafts 3, for preventing the end portion of the associated shaft 3 from moving downwardly from the predetermined position is provided in the associated shaft receiving pedestal 10. Thus, this embodiment can easily prevent the end portion of each of the shafts 3 from excessively downwardly moving. Consequently, this embodiment can easily prevent the optical pickup 4, which is supported by the shafts 3, from excessively downwardly moving. Accordingly, this embodiment can easily prevent the optical pickup 4 from colliding with other components and the like installed thereunder.

In this embodiment, each of the leaf springs 11 is substantially U-shaped in top view. Thus, the elastic portion of each of the leaf springs 11 can be lengthened. Consequently, an elastic force of each of the leaf springs 11 can be increased. Thus, the end portion of each of the shafts 3 can be more surely pressed against the associated adjusting screw 9.

Incidentally, it should be considered that the embodiment disclosed herein is illustrative and not restrictive in all respects, that the scope of the invention is defined by the appended claims rather than the description of the embodiment, and that all changes that fall within the meaning and range of equivalence of the claims are therefore to be intended to be embraced therein.

Although the leaf springs are used as the pressing members for pressing the insulating caps, which are respectively attached to the shafts, against the adjusting screws in the embodiment, the invention is not limited thereto. Elastic spring members other than the leaf springs maybe used. Alternatively, pressing members that do not have elasticity may be used.

Although the slip-off preventing wall 10a, which is used for preventing the end portion of each of the shafts 3 from slipping off the associated shaft receiving pedestal 10, and the support portion 10b, which is used for preventing the end portion of each of the shafts 3 from moving downwardly from the predetermined position, are provided in the associated shaft receiving pedestal 10 in the embodiment, the invention is not limited thereto. At least one of the slip-off preventing wall 10a and the support portion 10b, which are provided in each of the shaft receiving pedestals 10, may be omitted.

What is claimed is:

1. A disk apparatus comprising:
a metallic chassis;
a disk motor mounted on the chassis for rotating a disk;
an optical pickup disposed at a predetermined distance from the disk and being movable in a radial direction of the disk;
a metallic shaft for movably supporting the optical pickup;
a displacement motor attached to the chassis for displacing the optical pickup; and
a tilting mechanism for adjusting a tilt-angle of the optical pickup with respect to the disk, the tilting mechanism including:
an insulating cap attached to and covering an end portion of the metallic shaft, the insulating cap made of a resin and having insulation performance;
a metallic adjusting screw attached to the chassis in such a way as to abut against a bottom surface of the insulating cap attached to the end portion of the shaft for upwardly and downwardly moving the end portion of the shaft;
a shaft receiving pedestal made of a resin and attached to the chassis, the shaft receiving pedestal adapted to support the end portion of the shaft upwardly and downwardly movably, the shaft receiving pedestal having a slip-off preventing wall adapted to abut against an upper surface of the insulating cap for preventing the end portion of the shaft from slipping off and a support portion adapted to abut against a bottom surface of the end portion of the shaft for preventing the end portion of the shaft from downwardly moving rather than a predetermined position; and
a metallic leaf spring attached to the chassis via the shaft receiving pedestal and adapted to abut against the upper surface of the insulating cap attached to the end portion of the shaft, and also adapted to push the insulating cap attached to the end portion of the shaft against the adjusting screw, and substantially U-shaped in top view.

2. A disk apparatus comprising:
a chassis to which a displacement motor for displacing an optical pickup is attached;
a metallic shaft for movably supporting the optical pickup; and
a tilting mechanism for adjusting a tilt-angle of the pickup with respect to the disk, the tilting mechanism including:
an insulating member having insulation performance, which is attached to and covers an end portion of the shaft;
a metallic adjusting screw provided in such a way as to abut against the insulating member attached to the shaft;
a shaft receiving pedestal for supporting the end portion of the shaft upwardly and downwardly movably; and
a metallic pressing member for pressing the insulating member attached to the shaft against the adjusting screw.

3. The disk apparatus according to claim 2, wherein the shaft receiving pedestal includes a slip-off preventing wall for preventing the end portion of the shaft from slipping off.

4. The disk apparatus according to claim 2, wherein the shaft receiving pedestal includes a support portion for preventing the end portion of the shaft from downwardly moving rather than a predetermined position.

5. The disk apparatus according to claim 2, wherein the pressing member includes a metallic spring member.

6. The disk apparatus according to claim 5, wherein the spring member includes a metallic leaf spring substantially U-shaped in top view.

* * * * *